(12) United States Patent
Rakshit et al.

(10) Patent No.: US 11,934,501 B2
(45) Date of Patent: Mar. 19, 2024

(54) ROLLABLE EXTENDED MOBILE DEVICE DISPLAY

(71) Applicant: International Business Machines Corporation, Armonk, NY (US)

(72) Inventors: Sarbajit K. Rakshit, Kolkata (IN); Craig M. Trim, Ventura, CA (US); Martin G. Keen, Cary, NC (US); John M. Ganci, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 17/448,402

(22) Filed: Sep. 22, 2021

(65) Prior Publication Data

US 2023/0096823 A1    Mar. 30, 2023

(51) Int. Cl.
*G06F 21/32* (2013.01)
*E05B 65/00* (2006.01)
(Continued)

(52) U.S. Cl.
CPC .......... *G06F 21/32* (2013.01); *E05B 65/0067* (2013.01); *G06F 1/1652* (2013.01); *G06F 21/84* (2013.01); *E05B 47/0002* (2013.01)

(58) Field of Classification Search
CPC ........ G06F 21/32; G06F 1/1652; G06F 21/84; G06F 2203/04102; G06F 1/163; G06F 1/1654; G06F 1/1677; G06F 1/1681; G06F 1/1694; E05B 65/0067; E05B 47/0002; H04M 1/0216; H04M 1/0256; H04M 1/0268; H04M 1/72409; G09F 9/301
See application file for complete search history.

(56) References Cited

U.S. PATENT DOCUMENTS

| 726,140 A | 4/1903 | Campbell, Sr. |
| 8,020,327 B2 * | 9/2011 | Schellingerhout ...... G09F 21/02 40/586 |

(Continued)

FOREIGN PATENT DOCUMENTS

| EP | 2226989 A2 | 9/2010 |
| WO | 2015100396 A1 | 7/2015 |

(Continued)

OTHER PUBLICATIONS

"Build smarter mobile services and applications using IBM Cloud", Downloaded May 20, 2021, 7 pages, <https://www.ibm.com/cloud/mobile>.

(Continued)

*Primary Examiner* — J. Brant Murphy
(74) *Attorney, Agent, or Firm* — Randy Tejeda (57) ABSTRACT

One or more computer processors detect a computing device within a proximity to a rollable device. The one or more computer processors determine a location and an orientation of the rollable device relative to the computing device. The one or more computer processors attach the rollable device to the computing device utilizing the set of biometric locks engaged programmatically such that at least one side of the rollable device is locked and hinged to the computing device. The one or more computer processors responsive to the rollable device attached to a side of the computing device, extend a display area of the computing device to the rollable device.

20 Claims, 6 Drawing Sheets

(51) Int. Cl.
*G06F 1/16* (2006.01)
*G06F 21/84* (2013.01)
*E05B 47/00* (2006.01)

(56) References Cited

U.S. PATENT DOCUMENTS

| | | | | |
|---|---|---|---|---|
| 8,896,563 | B2* | 11/2014 | Myers | G06F 3/013 |
| | | | | 345/173 |
| 9,582,036 | B2* | 2/2017 | Bibl | H01L 25/0753 |
| 9,625,948 | B2* | 4/2017 | Zhang | G06F 1/1652 |
| 9,934,713 | B2* | 4/2018 | Morley | G06F 1/163 |
| 10,685,621 | B1* | 6/2020 | Kline | G09G 5/003 |
| 11,218,581 | B2* | 1/2022 | Qiu | G06F 3/041 |
| 2014/0180019 | A1* | 6/2014 | Martinez | A61B 5/681 |
| | | | | 600/300 |
| 2014/0239065 | A1* | 8/2014 | Zhou | G06F 1/1677 |
| | | | | 235/380 |
| 2015/0261366 | A1* | 9/2015 | Wong | G06F 1/1652 |
| | | | | 345/173 |
| 2015/0355677 | A1* | 12/2015 | Breedvelt-Schouten | |
| | | | | G09G 3/03 |
| | | | | 345/82 |
| 2016/0103322 | A1* | 4/2016 | Hall, Jr. | G02B 27/0176 |
| | | | | 29/428 |
| 2016/0171646 | A1* | 6/2016 | Breedvelt-Schouten | |
| | | | | G06F 3/014 |
| | | | | 345/647 |
| 2017/0060183 | A1* | 3/2017 | Zhang | G06F 1/1615 |
| 2017/0318943 | A1* | 11/2017 | Grote | A45C 15/06 |
| 2018/0042513 | A1* | 2/2018 | Connor | A61B 5/369 |
| 2018/0074553 | A1* | 3/2018 | Yamazaki | G06F 1/1622 |
| 2018/0260602 | A1* | 9/2018 | He | A61B 5/0075 |
| 2019/0205011 | A1* | 7/2019 | Li | G06F 3/04817 |
| 2019/0251325 | A1* | 8/2019 | Park | H05K 1/028 |
| 2020/0192423 | A1* | 6/2020 | Hsu | H05K 1/028 |
| 2021/0018879 | A1* | 1/2021 | Li | G04G 9/007 |
| 2021/0034111 | A1* | 2/2021 | Son | H04M 1/0202 |
| 2022/0201108 | A1* | 6/2022 | Kim | G06F 3/0383 |
| 2022/0223661 | A1* | 7/2022 | Rhee | H10K 50/868 |

FOREIGN PATENT DOCUMENTS

| | | |
|---|---|---|
| WO | 2017111192 A1 | 6/2017 |
| WO | 2020196947 A1 | 10/2020 |

OTHER PUBLICATIONS

"Dokon Cupboard Magnetic Locks Installation", YouTube, Nov. 21, 2019, 3 pages, <https://www.youtube.com/watch?v=dCL3Qrf9lO4>.

"IBM Watson products", Downloaded May 20, 2021, 21 pages, <https://www.ibm.com/watson/products-services>.

"Magnetic Hinge New invention Revolution in assembly and rotation", YouTube, Aug. 4, 2009, 3 pages, <https://www.youtube.com/watch?v=y_JyyBLGkek>.

Maslakovic, Marko, "How to avoid getting a rash from your fitness tracker or smartwatch", Dec. 31, 2019, 24 pages, <https://gadgetsandwearables.com/2019/12/31/fitness-tracker-rash/>.

O'Dea, S., "Smartphones in the U.S.—Statistics & Facts", Jan. 26, 2021, 6 pages, <https://www.statista.com/topics/2711/us-smartphone-market/#dossierSummary>.

Vogels, Emily A., "About one-in-five Americans use a smart watch or fitness tracker", Jan. 9, 2020, 5 pages, <https://www.pewresearch.org/fact-tank/2020/01/09/about-one-in-five-americans-use-a-smart-watch-or-fitness-tracker/>.

International Search Report and Written Opinion for Application No. PCT/EP/2022/074872, dated Dec. 21, 2022, 14 pages.

* cited by examiner

ROLLABLE EXTENDED MOBILE DEVICE DISPLAY

BACKGROUND

The present invention relates generally to the field of displays, and more particularly to rollable devices.

A flexible display or rollable display is an electronic visual display which is flexible in nature, as opposed to the traditional flat screen displays used in most electronic devices. Flexible or rollable devices are utilized in e-readers, mobile phones and other consumer electronics. Such screens can be rolled up like a scroll without the image or text being distorted.

SUMMARY

Embodiments of the present invention disclose a computer-implemented method, a computer program product, and a system. The computer-implemented method includes one or more computer processers detecting a computing device within a proximity to a rollable device. The one or more computer processors determine a location and an orientation of the rollable device relative to the computing device. The one or more computer processors attach the rollable device to the computing device utilizing the set of biometric locks engaged programmatically such that at least one side of the rollable device is locked and hinged to the computing device. The one or more computer processors responsive to the rollable device attached to a side of the computing device, extend a display area of the computing device to the rollable device.

DETAILED DESCRIPTION

Traditional smartwatches are worn on a wrist of a user but there are many use cases in which the user does not want to wear the smartwatch for extended periods of time, but the user still wants the functionality of the smartwatch to be on hand. Currently, no solution exists for a user to utilize a rollable smartwatch as an external or transparent display for an on-hand computing device (e.g., mobile device). Embodiments of the present invention provide a solution through a rollable device that can be unrolled and worn around the wrist of the user, wherein the rollable device is comprised of a rollable transparent display. Embodiments of the present invention provide the rollable device (e.g., smartwatch) that locks at both ends of a rollable band (e.g., smartwatch band) to securely lock on a wrist of a user or on any side or edge of a computing device. In an embodiment, the rollable device includes biometric sensors on both ends of the smartwatch band such that when the rollable device is rolled or wrapped around a wrist the connected sensors gather biometric information (i.e., heart rate, blood-oxygen, etc.). Embodiments of the present invention attach the rollable device to a computing device and provide portable storage to an attached computing device. Embodiments of the present invention charge or provide charging to an attached computing device. Implementation of embodiments of the invention may take a variety of forms, and exemplary implementation details are discussed subsequently with reference to the Figures.

The present invention will now be described in detail with reference to the Figures.

Figure 1:
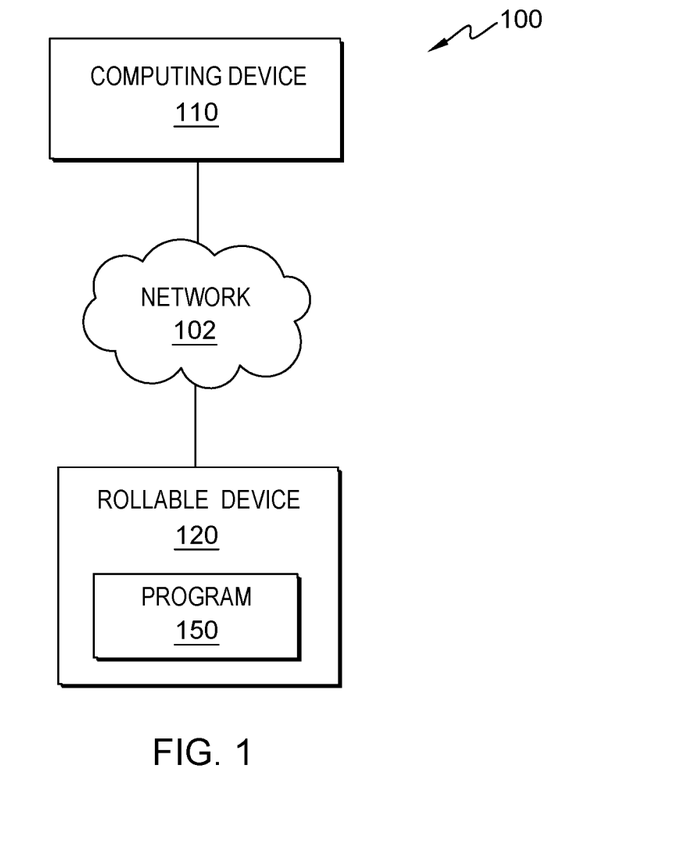
FIG. 1 (i.e., FIG.) is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 and rollable device 120 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 110, rollable device 120, and other computing devices (not shown) within distributed data processing environment 100. In various embodiments, network 102 operates locally via wired, wireless, or optical connections and can be any combination of connections and protocols (e.g., personal area network (PAN), near field communication (NFC), laser, infrared, ultrasonic, etc.).

Computing device 110 may be any electronic device or computing system capable of processing program instructions and receiving and sending data. In some embodiments, computing device 110 may be a laptop computer, a tablet computer, a netbook computer, a personal digital assistant (PDA), a smart phone, or any programmable electronic device capable of communicating with network 102. In general, computing device 110 is representative of any electronic device or combination of electronic devices capable of executing machine readable program instructions as described in greater detail with regard to FIG. 6, in accordance with embodiments of the present invention.

Rollable device 120 can be a rollable smartwatch, rollable display, or any other rollable electronic device or rollable computing system capable of receiving, sending, and processing data. In another embodiment, rollable device 120 can be any rollable device or any programmable electronic device capable of communicating with computing device 110 and other computing devices (not shown) within distributed data processing environment 100 via network 102. In the depicted embodiment, rollable device 120 includes program 150. In other embodiments, rollable device 120 may contain other applications, databases, programs, etc. which have not been depicted in distributed data processing environment 100. In an embodiment, rollable device 120 contains a database (not depicted) as a repository for data used by program 150. In the depicted embodiment, the database resides on rollable device 120. In another embodiment, the database may reside on computing device 110 or elsewhere within distributed data processing environment 100 provided program 150 has access to the database. A database is an organized collection of data. The database can be implemented with any type of storage device capable of storing data and configuration files that can be accessed and utilized by program 150, such as a database server, a hard disk drive, or a flash memory. In an embodiment, the database stores data used by program 150, such as historical rollable device 120 utilizations, common computing device 110 pairings, historical biometric user information, and learned lock/unlocking user gestures. Rollable device 120 may include internal and external hardware components, as depicted and described in further detail with respect to FIGS. 4, 5, and 6.

Program 150 is a program for rollable device display management. In various embodiments, program 150 may implement the following steps: detect a computing device within a proximity to a rollable device; determine a location and an orientation of the rollable device relative to the computing device; attach the rollable device to the computing device utilizing the set of biometric locks engaged programmatically such that at least one side of the rollable device is locked and hinged to the computing device; and responsive to the rollable device attached to a side of the computing device, extend a display area of the computing device to the rollable device. In the depicted embodiment, program 150 is a standalone software program. In another embodiment, the functionality of program 150, or any combination programs thereof, may be integrated into a single software program. In some embodiments, program 150 may be located on separate computing devices or rollable devices (not depicted) but can still communicate over network 102. In various embodiments, client versions of program 150 resides on computing device 110 and/or any other computing device (not depicted) within distributed data processing environment 100. Program 150 is depicted and described in further detail with respect to FIG. 2.

The present invention may contain various accessible data sources, such as the database, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
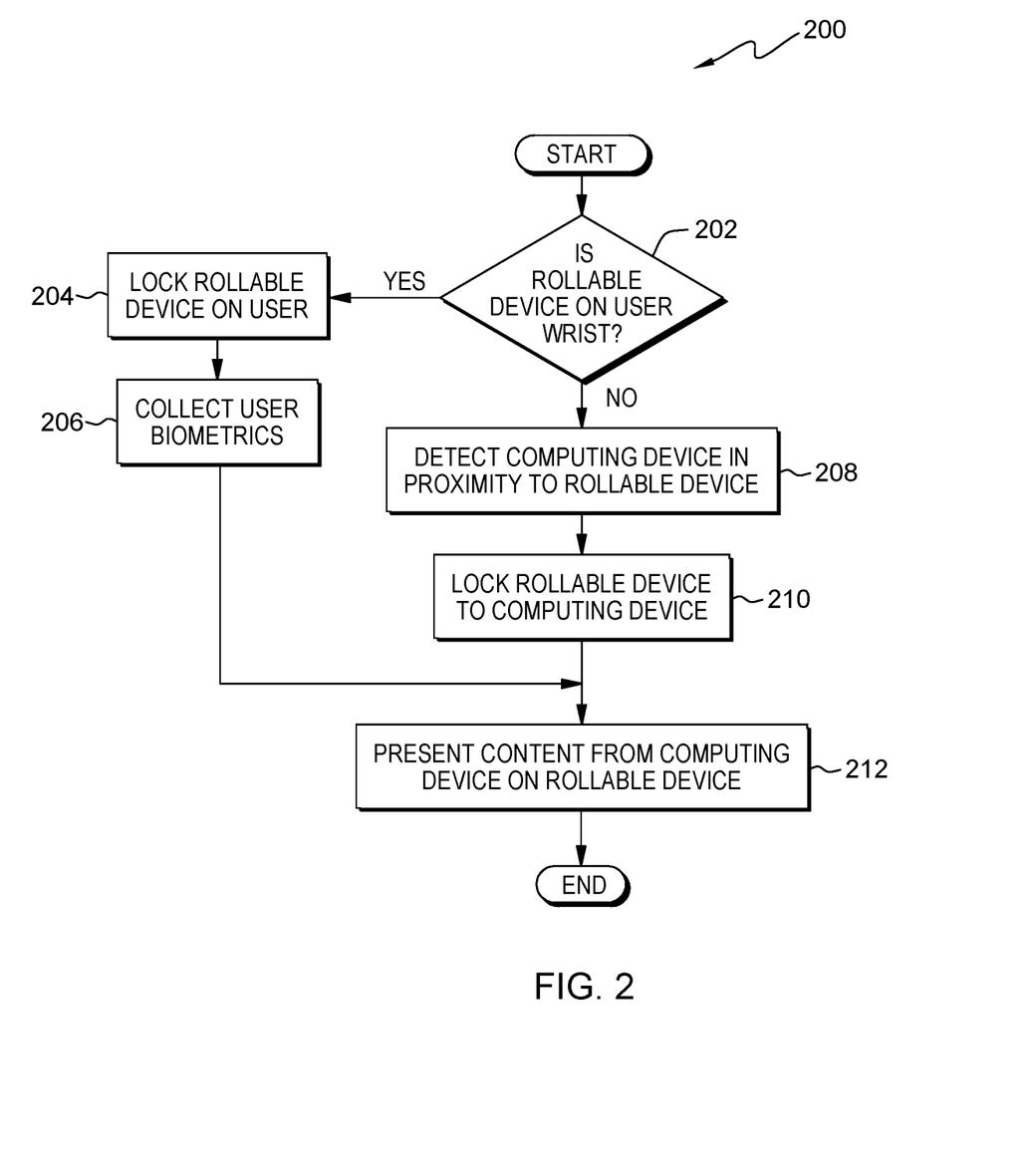
FIG. 2 is a flowchart depicting operational steps of a program, on a rollable device within the data processing environment of FIG. 1, for rollable device management, in accordance with an embodiment of the present invention.

FIG. 2 depicts flowchart 200 illustrating operational steps of program 150 for rollable device display management, in accordance with an embodiment of the present invention.

Figure 3A:
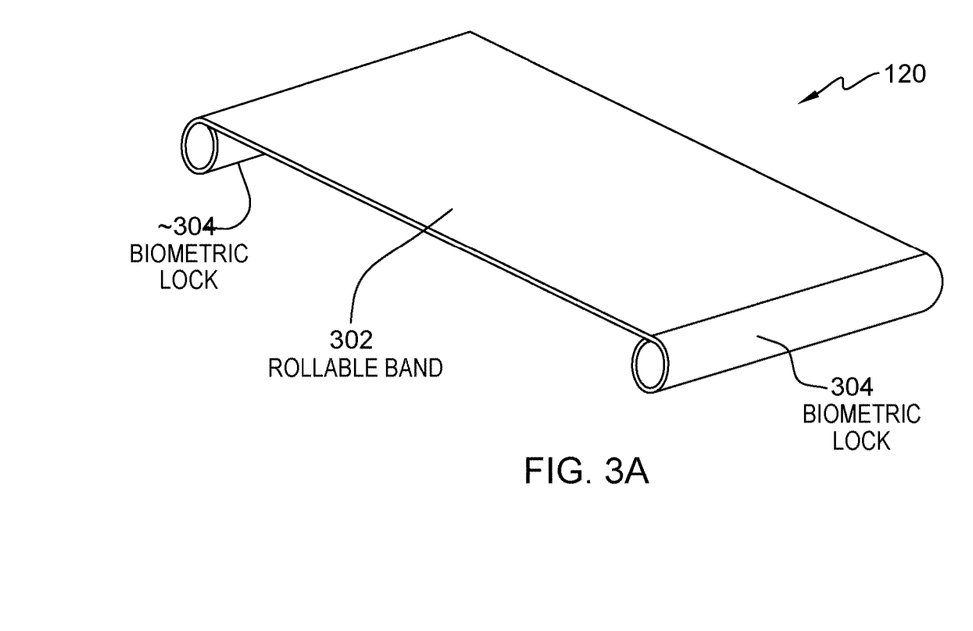
FIG. 3A is an assembled view of the rollable device, in accordance with an embodiment of the present invention.

If a rollable device is on a wrist of a user ("yes" branch, decision block 202), then program 150 locks the rollable device on the user (step 204). In an embodiment, program 150 initiates responsive to rollable device 120 automatically powering on based on user interaction, such as a user putting on a rollable smartwatch (i.e., rollable device 120) or the user lifting and carrying rollable device 120. In an embodiment, program 150 detects a user through the biometric sensors contained within a plurality of biometric lock 304 as the user rolls rollable device 120 forming a contact point with biometric lock 304 and the user. In another embodiment, program 150 detects and identifies the user by identifying unique user voice patterns or hand characteristics and positions associated with the user. Responsive to program 150 identifying the user, program 150 locks rollable device 120 on the user by programmatically locking a plurality of biometric lock 304 together as the plurality of biometric lock 304 contact. In this embodiment, program 150 rolls rollable device 120 onto the user according to user parameters (e.g., user wrist diameter, historical rolling diameter of rollable device 120, etc.) through a plurality of embedded piezoelectric strips (not depicted).

Program 150 collects user biometrics (step 206). Rollable device 120 includes biometric sensors, contained within biometric lock 304, attached to opposing ends or sides of rollable band 302. In an embodiment, program 150 collects biometric user data (i.e., heart rate, blood-oxygen, etc.). In another embodiment, program 150 collects hand, wrist, and finger positioning information and associates said information with user intentions or actions (e.g., device attachment, detachment, display interactions, etc.). For example, program 150 identifies a finger pattern associated with a user intention to unlock biometric lock 304. In another example, the user frequently locks rollable device 120 on the left wrist, thus program 150 continuously monitors the left wrist and associated fingers to derive user specific gestures. In a continuing example, program 150 learns or associates the user forming a bridge between the tips of the thumb and index finger as a user indication of detachment. Here, program 150 programmatically releases biometric lock 304 from the wrist of the user. In these embodiments, program 150 predicts a user intention for rollable device 120 detachment based on any combination of user arm, wrist, and/or finger position(s). In another embodiment, the user detaches rollable device 120 (i.e., unlocks biometric lock 304) through a control menu associated with a paired computing device 110 or rollable device 120.

If the rollable device is not on the wrist of a user ("no" branch, decision block 202), then program 150 detects a computing device in a proximity to the rollable device (step 208). In an embodiment, the user pairs one or more computing device 110 to rollable device 120 through a wireless network. In this embodiment, program 150 detects and identifies the one or more paired computing device(s) 110 responsive to the paired computing devices entering a distance based proximity (e.g., 6 inches) to rollable device 120. In these embodiments, program 150 continuously identifies every computing device within the distance proximity. Responsive to program 150 identifying and authenticating (e.g., previously paired) computing device 110, program 150 determines the location and orientation of computing device 110 relative to the rollable device 120. In another embodiment, program 150 transmits specific sound waves (e.g., ultrasonic, etc.) from a speaker (not depicted) attached to the computing device 110 or rollable device 120 to detect respective relative positions. In an embodiment, program 150 utilizes sensors (not depicted) to determine the orientations and locations of rollable device 120 and computing device 110, relative to each other. In a further embodiment, program utilizes proximity sensors (not depicted) located in each device to determine said locations and orientations. For example, program 150 utilizes proximity sensors located within computing device 110 and/or rollable device 120 to determine that computing device 110 is located to the left of rollable device 120 and that the devices are within a one foot radius of each other. In yet another embodiment, program 150 utilizes orientation sensors, such as an accelerometer (not depicted) to determine the relative orientations. In various embodiments, program 150 actively polls and monitors said sensors for changes to location and/or orientation of computing device 110 and rollable device 120.

Program 150 locks the rollable device to the computing device (step 210). Responsive to program 150 identifying the location and orientation of computing device 110 relative to rollable device 120, program 150 attaches rollable device 120 to computing device 110. In an embodiment, rollable device 120 is attached to computing device 110 utilizing using a magnetic lock (i.e., biometric lock 304), engaged programmatically such that at least one side of rollable device 120 is locked and hinged to computing device 110. Here, biometric lock 304 is representative of one or more magnetic locks with bidirectional hinges located both ends of rollable band 302. Biometric lock 304 allows rollable device 120 to lock in place and allow the ability to flip rollable device 120 while maintaining an extended display for computing device 110. In this embodiment, rollable device 120 is locked and hinged, via biometric lock 304, to computing device 110, such that the user can rotate or turn rollable device 120 on any side to increase the display dimensions of attached computing device 110. In an embodiment, program 150 utilizes embedded piezoelectric strips to adjust the locked position of rollable device 120 relative to computing device 110.

Figure 4:
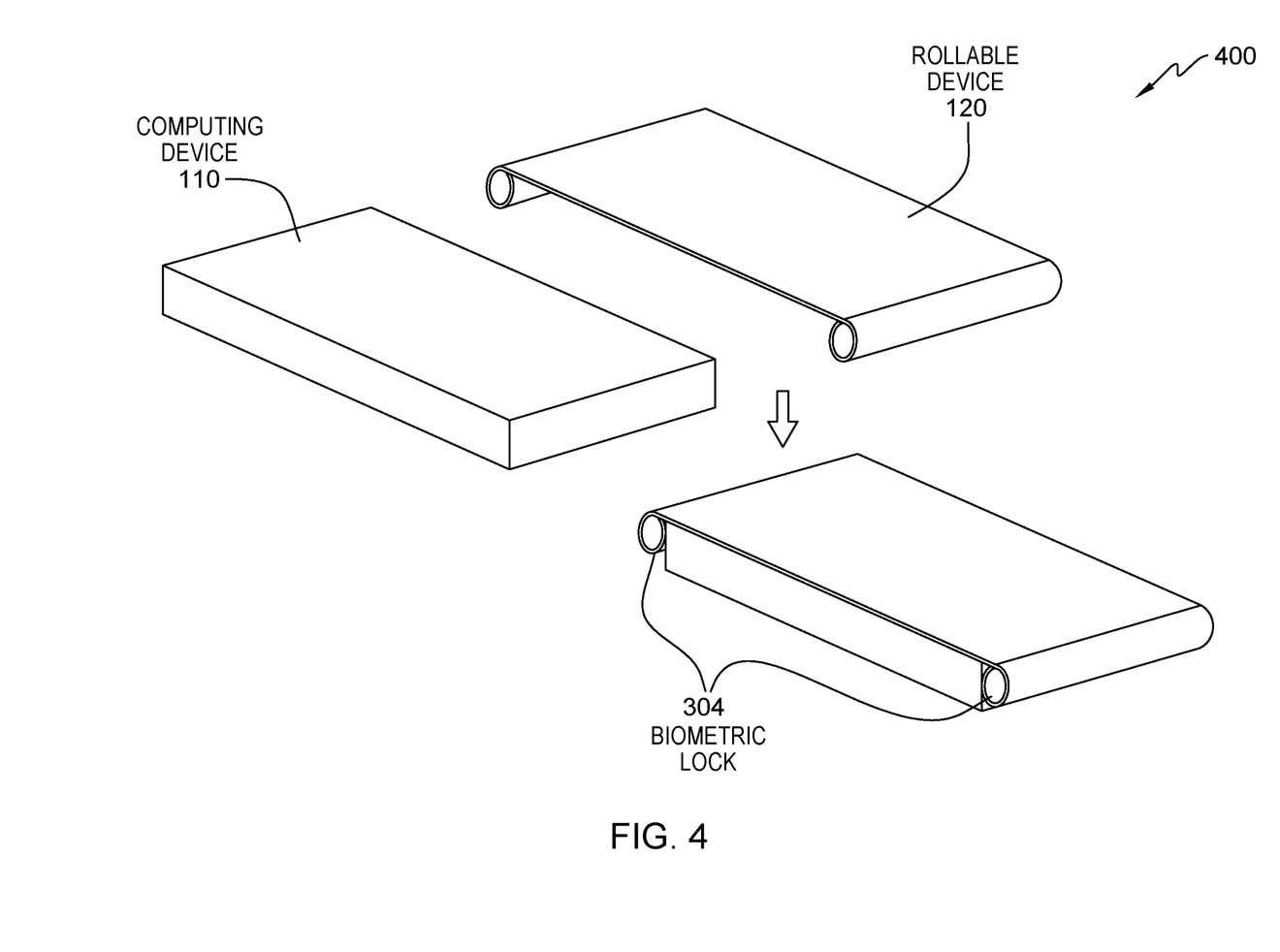
FIG. 4 is a diagram illustrating an embodiment of the rollable device within the data processing environment of FIG. 1, in accordance with an embodiment of the present invention.

Program 150 presents content from the computing device on the rollable device (step 212). Program 150 extends or mirrors the content and/or display area (i.e., one or more graphical elements) of computing device 110 onto the display area (i.e., rollable band 302) of rollable device 120. Rollable device 120 can be unrolled, attached and locked in position to computing device 110 to create an extended display for computing device 110. Dependent on the identified relative positions and orientations of rollable device 120 and computing device 110, program 150 provides a plurality of presentation modes through rollable device 120 for computing device 110. In an embodiment, if rollable device 120 is attached directly on top of computing device 110, as depicted in FIG. 4, program 150 places rollable device 120 into a transparent presentation mode where the existing display area of computing device 110 is viewed through or mirrored on rollable device 120 (i.e., mirroring graphical elements on the computing device 110). For example, if computing device 110 is running a communication application, program 150 reproduces at least a portion of the graphical elements (e.g., panels, menus, notifications, etc.) associated with the application onto rollable device 120. In an embodiment, rollable device 120 responds to user touch commands such that the user can interact with computing device 110 through rollable device 120. Here, program 150 maps display touch capabilities of computing device 110 through rollable band 302 contained within rollable device 120. In a further embodiment, responsive to the user selecting one or more graphical elements on a mirrored rollable device 120, program 150 removes any graphical elements that have not been selected. In an example scenario, a spreadsheet application contains several graphical elements that include a table, a side panel, and a top navigation bar. In this scenario, the user selects on the side panel on the rollable device 120 and responsively program 150 removes the table and top navigation bar from rollable device 120.

Figure 5:
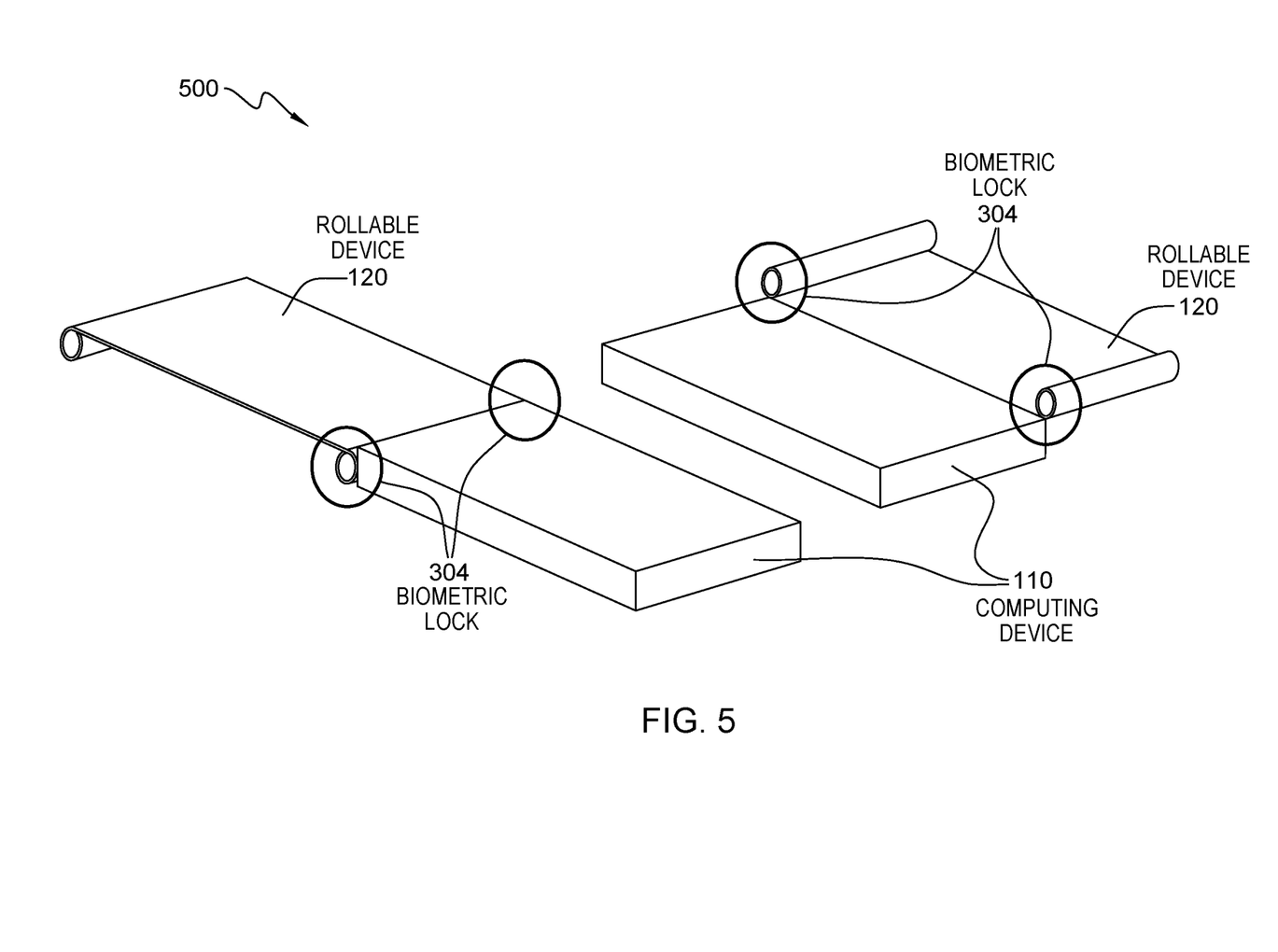
FIG. 5 is a diagram illustrating an embodiment of the rollable device within the data processing environment of FIG. 1, in accordance with an embodiment of the present invention.

In another embodiment, program 150 responsive to the user attaching rollable device 120 edgewise to computing device 110, as depicted in FIG. 5, program 150 expands the display of computing device 110 by incorporating the display area of rollable device 120. In another embodiment, program 150 adjusts the dimensions of the display of computing device 110 corresponding to the introduction of the display area of rollable device 120. For example, if program 150 expands the display dimensions of computing device 110, then program 150 instructs the user on how to correctly flip, folded, unfold, and/or attach rollable device 120 or program 150 utilizes piezoelectric strips to adjust the orientation of rollable device 120 and accordingly apply biometric lock 304 to the identified side of computing device 110 while any other attached sides are unlocked. In an embodiment, based on a user need, program 150 instructs the user to flip rollable device 120 on any available side and responsively, increases the display dimensions of computing device 110 through flipped rollable device 120. In this embodiment, based on the direction of flip, program 150 dynamically changes biometric lock 304 such that the user can flip and, subsequently, attach rollable device 120 in any direction. In an embodiment, program 150 adjusts biometric lock 304 according to a learned user hand position, wherein program 150 identifies which side to flip the rollable device 120 while engaging the appropriate magnetic locking hinge (i.e., biometric lock 304) based on the position of the hand holding rollable device 120 relative to computing device 110.

Program 150 dynamically alter applications and content presented on rollable device 120 to reconcile with changes in orientation or location to either rollable device 120 or computing device 110. For example, if program 150 presents a list panel to the rollable device 120 in a vertical orientation but computing device 110 is rotated 90 degrees to a horizontal orientation, responsive program 150 detects this change and modifies the presented content to conform with the change. In this example, program 150 may increase or decrease the amount of information displayed based on the orientation and/or location change. In an embodiment, program 150 presents one or more graphical elements from computing device 110 on rollable device 120, such side panels, lists, tables, notifications, pop-ups, dialog boxes, forms, charts, etc. In another embodiment, program 150 presents at least a portion of an application running on computing device 110 on rollable device 120. For example, responsive to the user clicking or touching an item in a list of items on the computing device 110, then program 150 reproduces a dialog box on the rollable device displaying additional details regarding the clicked item. In various embodiments, program 150 changes the graphical elements presented on rollable device 120 based on the relative location and orientation of the devices. For example, if rollable device 120 is situated to the right of computing device 110, then program 150 presents an extended right side pane on rollable device 120. In an embodiment, program 150 adjusts the presented applications and associated content based on orientation, location, application, and user conditions. In this embodiment, orientation conditions control content responsive to rollable device 120 or computing device 110 rotating to specific relative angle. For example, when the user orients rollable device 120 in a vertical orientation, program 150 presents a list from computing device 110 due to the increased vertical display area. User conditions are specific to a user utilizing the devices, where program 150 associates frequently used applications and presented graphical elements with a specific user, allowing program 150 to automatically adjust presented graphical elements responsive to a specific user initiating an application.

In an embodiment, program 150 identifies the user attaching rollable device 120 to computing device 110 and incorporates user preferences (e.g., historical rollable device 120 applications, user grip information (i.e., force applied by hand and fingers of the user when interacting with or detaching rollable device 120) and associated intentions, etc.). Program 150 utilizes the incorporated user preferences to predict when to detach rollable device 120 from computing device 110. In an embodiment, program 150 predicts when to detach to rollable device 120 based on perceived user intention through derived user grip patterns on biometric lock 304 or rollable band 302. Here, responsive to program 150 predicting the user intention of rollable device 120 detachment, program 150 detaches biometric lock 304 from computing device 110. In another embodiment, program 150 detaches rollable device 120 responsive to the termination of an application. For example, program 150 detaches rollable device 120 when no applications are running on computing device 110. In another embodiment, the user utilizes a presented menu to detach rollable device 120 from computing device 110.

Figure 3B:
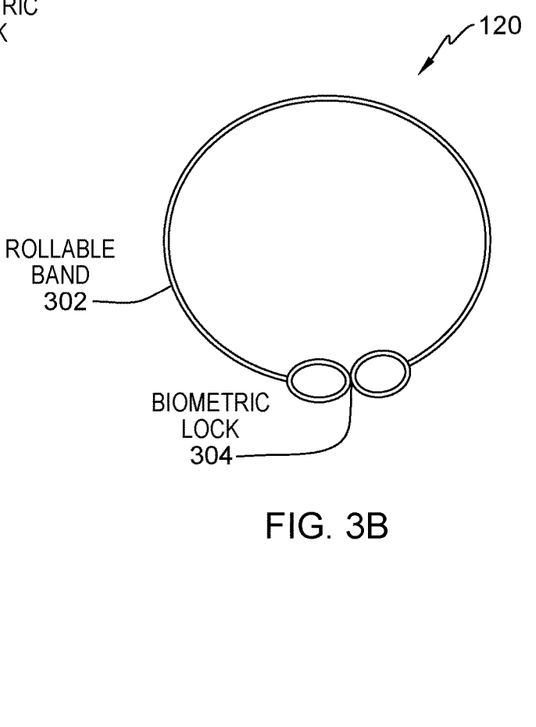
FIG. 3B is an assembled view of the rollable device locked, in accordance with an embodiment of the present invention.

FIG. 3A is an assembled view of a rollable device 120. Rollable device 120 includes rollable band 302 and biometric lock 304. In this embodiment, rollable band 302 is a rollable transparent display, allowing program 150 to display content on rollable band 302. In this embodiment, the edges of rollable device 120 include a frame where the compute processor and battery are located. In an embodiment, rollable band 302 is stretchable, allowing for rollable device 120 to fold to half width when worn on wrist or unfolded to double width when attached to computing device 110. In another embodiment, rollable band 302 is touch enabled such that the user can interact with the presented content on rollable device 120. In FIGS. 3A and 3B, biometric lock 304 is a set of magnetic locks with integrated biometric sensors capable of recording user biometric information (e.g., heart rate, blood-oxygen, wrist/finger positions, grip strength, etc.). FIG. 3B is an assembled view of a rolled and locked rollable device 120. Biometric lock 304 creates a magnetic field that when energized causes opposing sides of a plurality of biometric lock 304 to attract and lock when rolled (e.g., rolled around the wrist of a user). In this embodiment, biometric lock 304 are coupled on opposite edges of rollable device 120, allowing secure locking around the wrist of a user, as depicted in FIG. 3B. In this embodiment, biometric lock 304 include biometric sensors on both ends of rollable band 302 such that when wrapped around a user wrist the connected sensors gather biometric user data.

FIG. 4 depicts diagram 400, in accordance with an illustrative embodiment of the present invention. Diagram 400 demonstrates rollable device 120 attaching to the face of computing device 110 through biometric lock 304. In FIGS. 4 and 5, biometric lock 304 is a set of magnetic hinge locks in which program 150 utilizes electromagnetism to modify biometric lock 304 for attaching rollable device 120 to computing device 110. In an embodiment, biometric lock 304 is comprised of a magnetic locking element coupled to one or more sides of rollable device 120. In this embodiment, biometric lock 304 and computing device 110 form a magnetic lock and hinge system, wherein a side or surface of computing device 110 is the male component (i.e., hinge) and biometric lock 304 is the female component (i.e., lock). Here, program 150 controls the magnetism of biometric lock 304 in order to attach to one or more sides or surfaces of computing device 110. In an embodiment, biometric lock 304 is comprised of a plurality of alternating magnets in circular or rolled structure, where biometric lock 304 creates a series of reversed polarization attachment points with computing device 110, forming a lock/hinge structure. This embodiment allows program 150 to dynamically adapt biometric lock 304 for rotatably and removably coupling with computing device 110. In another embodiment, biometric lock 304 and computing device 110 attach utilizing a series of mating connections comprised of a plurality of component parts with mutually complementing shapes. In the above embodiments, program 150 places rollable device 120 into a transparent presentation mode where the existing display area of computing device 110 is mirrored on rollable device 120. In an embodiment, rollable device 120 provides portable storage to computing device 110 through network 102. In another embodiment, program 150 charges rollable device 120 from computing device 110 when attached to surface or back of computing device 110.

FIG. 5 depicts diagram 500, in accordance with an illustrative embodiment of the present invention. Diagram 500 demonstrates two embodiments of varying positions and orientations of computing device 110 and rollable device 120, each locked utilizing biometric lock 304, as described in FIG. 4. In each embodiment, program 150 expands the display of computing device 110 through the reproduction or replacement of graphical elements from computing device 110 to rollable device 120.

Figure 6:
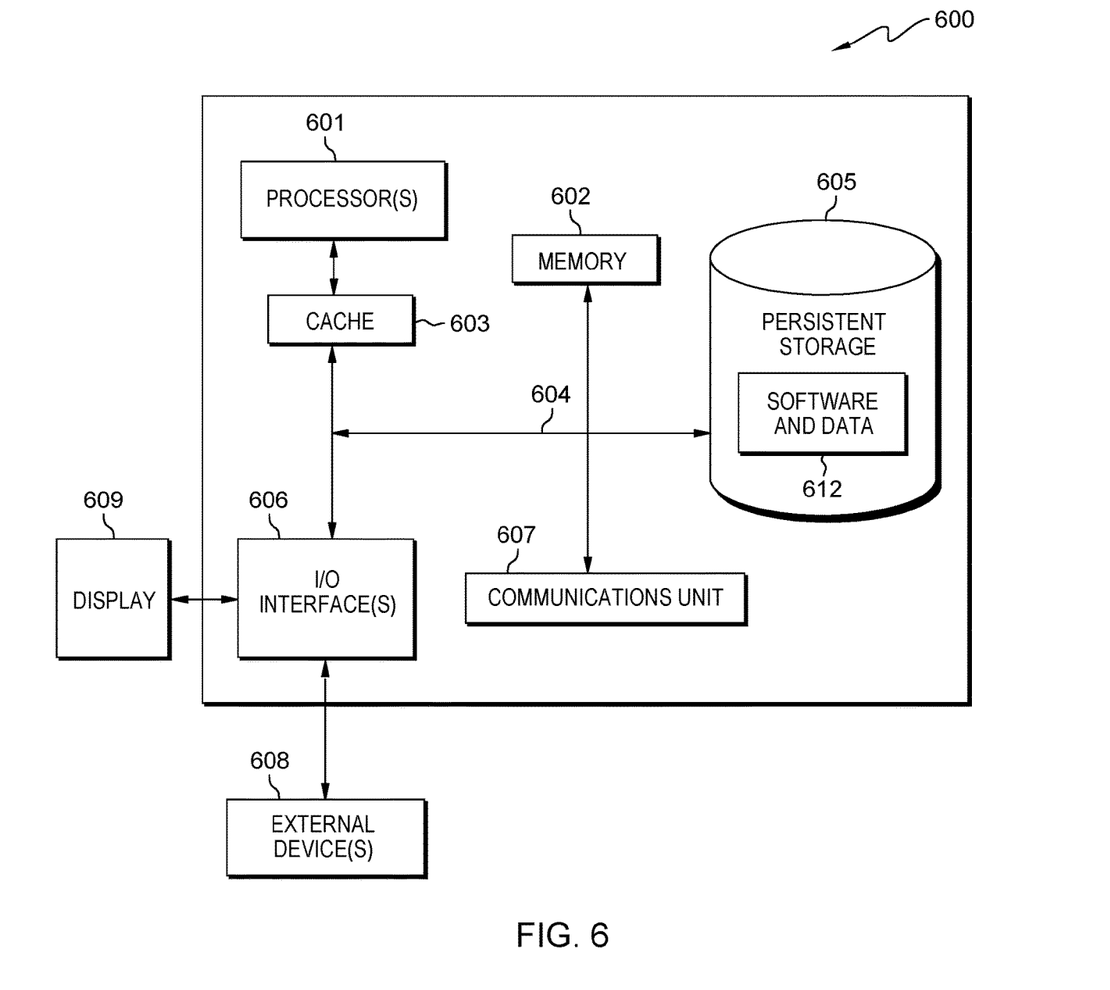
FIG. 6 is a block diagram of components of a computing device and the rollable device, in accordance with an embodiment of the present invention.

FIG. 6 depicts block diagram 600 illustrating components of computing device 110 and rollable device 120 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 110 and rollable device 120 include communications fabric 604, which provides communications between cache 603, memory 602, persistent storage 605, communications unit 607, and input/output (I/O) interface(s) 606. Communications fabric 604 can be implemented with any architecture designed for passing data and/or control information between processors (such as microprocessors, communications, and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random access memory (RAM). In general, memory 602 can include any suitable volatile or non-volatile computer readable storage media. Cache 603 is a fast memory that enhances the performance of computer processor(s) 601 by holding recently accessed data, and data near accessed data, from memory 602.

Program 150 may be stored in persistent storage 605 and in memory 602 for execution by one or more of the respective computer processor(s) 601 via cache 603. In an embodiment, persistent storage 605 includes a magnetic hard disk drive. Alternatively, or in addition to a magnetic hard disk drive, persistent storage 605 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605. Software and data 612 can be stored in persistent storage 605 for access and/or execution by one or more of the respective processors 601 via cache 603.

Communications unit 607, in these examples, provides for communications with other data processing systems or devices. In these examples, communications unit 607 includes one or more network interface cards. Communications unit 607 may provide communications through the use of either or both physical and wireless communications links. Program 150 may be downloaded to persistent storage 605 through communications unit 607.

I/O interface(s) 606 allows for input and output of data with other devices that may be connected, respectively, to computing device 110 and rollable device 120. For example, I/O interface(s) 606 may provide a connection to external device(s) 608, such as a keyboard, a keypad, a touch screen, and/or some other suitable input device. External devices 608 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 605 via I/O interface(s) 606. I/O interface(s) 606 also connect to a display 609.

Display 609 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   detecting, by one or more computer processors, a computing device within a proximity to a rollable device, wherein the rollable device comprises:
      a transparent rollable band; and
      a set of biometric locks attached to opposing sides of the transparent rollable band;
   determining, by one or more computer processors, a location and an orientation of the rollable device relative to the computing device;
   attaching, by one or more computer processors, the rollable device to the computing device utilizing the set of biometric locks engaged programmatically such that at least one side of the rollable device is locked and hinged to the computing device; and
   responsive to the rollable device attached to a side of the computing device, extending, by one or more computer processors, a display area of the computing device to the rollable device.

2. The computer-implemented method of claim 1, further comprising:
   responsive to the rollable device attached on top of the computing device, mirroring, by one or more computer processors, the display area of the computing device to the rollable device.

3. The computer-implemented method of claim 1, further comprising:
   identifying, by one or more computer processors, a side of the rollable device to flip based on a user hand position holding the rollable device relative to the computing device while engaging the set of biometric locks.

4. The computer-implemented method of claim 1, further comprising:
   dynamically altering, by one or more computer processors, content presented on the rollable device to reconcile with one or more changes in the respective orientation or location of the rollable device or the computing device.

5. The computer-implemented method of claim 1, further comprising:
   adjusting, by one or more computer processors, the orientation or location of the rollable device relative to the computing device utilizing one or more piezoelectric strips embedded in the rollable device.

6. The computer-implemented method of claim 1, further comprising:
   predicting, by one or more computer processors, a user intention of a detachment of the rollable device from the computing device based learned user grip or user finger patterns.

7. The computer-implemented method of claim 1, wherein the biometric lock is a magnetic locking hinge.

8. A computer program product comprising:
   one or more computer-readable tangible storage devices and program instructions stored on the one or more computer-readable tangible storage devices, the stored program instructions comprising:

program instructions to detect a computing device within a proximity to a rollable device, wherein the rollable device comprises:
   a transparent rollable band; and
   a set of biometric locks attached to opposing sides of the transparent rollable band;
program instructions to determine a location and an orientation of the rollable device relative to the computing device;
program instructions to attach the rollable device to the computing device utilizing the set of biometric locks engaged programmatically such that at least one side of the rollable device is locked and hinged to the computing device; and
program instructions to responsive to the rollable device attached to a side of the computing device, extend a display area of the computing device to the rollable device.

9. The computer program product of claim 8, wherein the program instructions, stored on the one or more computer-readable tangible storage devices, further comprise:
   program instructions to responsive to the rollable device attached on top of the computing device, mirror the display area of the computing device to the rollable device.

10. The computer program product of claim 8, wherein the program instructions, stored on the one or more computer-readable tangible storage devices, further comprise:
   program instructions to identify a side of the rollable device to flip based on a user hand position holding the rollable device relative to the computing device while engaging the set of biometric locks.

11. The computer program product of claim 8, wherein the program instructions, stored on the one or more computer-readable tangible storage devices, further comprise:
   program instructions to dynamically alter content presented on the rollable device to reconcile with one or more changes in the respective orientation or location of the rollable device or the computing device.

12. The computer program product of claim 8, wherein the program instructions, stored on the one or more computer-readable tangible storage devices, further comprise:
   program instructions to adjust the orientation or location of the rollable device relative to the computing device utilizing one or more piezoelectric strips embedded in the rollable device.

13. The computer program product of claim 8, wherein the program instructions, stored on the one or more computer-readable tangible storage devices, further comprise:
   program instructions to predict a user intention of a detachment of the rollable device from the computing device based learned user grip or user finger patterns.

14. The computer program product of claim 8, wherein the biometric lock is a magnetic locking hinge.

15. A computer system comprising:
   one or more computer processors;
   one or more computer readable storage media; and
   program instructions stored on the computer readable storage media for execution by at least one of the one or more processors, the stored program instructions comprising:
      program instructions to detect a computing device within a proximity to a rollable device, wherein the rollable device comprises:
         a transparent rollable band; and
         a set of biometric locks attached to opposing sides of the transparent rollable band;
      program instructions to determine a location and an orientation of the rollable device relative to the computing device;
      program instructions to attach the rollable device to the computing device utilizing the set of biometric locks engaged programmatically such that at least one side of the rollable device is locked and hinged to the computing device; and
      program instructions to responsive to the rollable device attached to a side of the computing device, extend a display area of the computing device to the rollable device.

16. The computer system of claim 15, wherein the program instructions stored, on the one or more computer readable storage media, further comprise:
   program instructions to responsive to the rollable device attached on top of the computing device, mirror the display area of the computing device to the rollable device.

17. The computer system of claim 15, wherein the program instructions stored, on the one or more computer readable storage media, further comprise:
   program instructions to identify a side of the rollable device to flip based on a user hand position holding the rollable device relative to the computing device while engaging the set of biometric locks.

18. The computer system of claim 15, wherein the program instructions stored, on the one or more computer readable storage media, further comprise:
   program instructions to dynamically alter content presented on the rollable device to reconcile with one or more changes in the respective orientation or location of the rollable device or the computing device.

19. The computer system of claim 15, wherein the program instructions stored, on the one or more computer readable storage media, further comprise:
   program instructions to adjust the orientation or location of the rollable device relative to the computing device utilizing one or more piezoelectric strips embedded in the rollable device.

20. The computer system of claim 15, wherein the program instructions stored, on the one or more computer readable storage media, further comprise:
   program instructions to predict a user intention of a detachment of the rollable device from the computing device based learned user grip or user finger patterns.

* * * * *